United States Patent
Volkmann et al.

(10) Patent No.: US 6,227,560 B1
(45) Date of Patent: May 8, 2001

(54) GAS GENERATOR HOUSING

(75) Inventors: Matthias Volkmann, Kronberg/TS; Peter Priemer, Ebsdorf; Albrecht Kretzschmar, Frankfurt; Stefan Jost, Eppstein-Bremthal, all of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/269,694

(22) PCT Filed: Sep. 19, 1997

(86) PCT No.: PCT/GB97/02540
    § 371 Date: Dec. 6, 1999
    § 102(e) Date: Dec. 6, 1999

(87) PCT Pub. No.: WO98/14351
    PCT Pub. Date: Apr. 9, 1998

(30) Foreign Application Priority Data

Oct. 3, 1996 (GB) .................................................. 9620658
Jul. 23, 1997 (GB) .................................................. 9715589

(51) Int. Cl.$^7$ .................................................. B60R 21/16
(52) U.S. Cl. ...................................... 280/728.2; 280/730.2
(58) Field of Search ............................... 280/730.2, 728.2

(56) References Cited

U.S. PATENT DOCUMENTS 5,284,358 * 2/1994 Rhein .............................. 280/728.2
5,816,607 * 10/1998 Bugdaci et al. ................ 280/728.2
5,839,751 * 11/1998 Lutz ................................ 280/728.2

FOREIGN PATENT DOCUMENTS 0 822 124 A1   7/1997  (EP) .

* cited by examiner

Primary Examiner—Eric Culbreth
(74) Attorney, Agent, or Firm—Markell Seitzman

(57) ABSTRACT

A housing (1) for a gas generator (9) for a vehicle occupant side airbag inflator, the housing (1) comprising an elongate back plate (2) for supporting the gas generator (9) having side flanges (3) extending laterally of the gas generator (9) at one end of the back plate (2) and having a retaining ring fixed to the back plate (2) at its other end, and arranged to circumscribe the gas generator (9), to hold the gas generator (9) securely. Preferably the housing (1) has an integral manifold and the retaining ring end is open to accommodate different widths and lengths of gas generator (9). The invention allows mounting of a gas generator with much reduced rattle.

9 Claims, 2 Drawing Sheets

GAS GENERATOR HOUSING

DESCRIPTION

The present invention relates to a gas generator housing and particularly to such for use with a gas generator and for a vehicle occupant safety restraint airbag, and which serves as a manifold for inflation of the airbag.

Airbag modules are bulky and heavy items, particularly for the passenger side of a vehicle where a large capacity airbag must be used to fill the space between the passenger and the instrument panel. This requires a large capacity gas generator which is traditionally a cylinder with a gas outlet at one end. It is secured to the vehicle and the airbag by being mounted in a metal housing connected to a manifold which directs the gas into the inflation opening of an airbag.

Problems are encountered with known mounting arrangements in that they are heavy, costly, bulky and there is a tendency for the gas generator to rattle against the metal housing surface producing undesirable noise.

The present invention aims to provide an improved and more compact mounting arrangement, and is particularly advantageous whenever packaging space is restricted.

According to the present invention there is provided a housing for a gas generator for a side airbag inflator in a vehicle safety restraint, the housing comprising an elongate back plate for supporting the gas generator, and having means for mounting to a fixed part of the vehicle, the back plate having, at one end region, side flanges extending laterally of the gas generator and, at the other end region, having a retaining ring fixed to the back plate which is arranged to circumscribe the gas generator, to hold the gas generator securely to the housing and thus to a fixed part of the vehicle.

The housing thus holds the gas generator under tension and prevents it rattling, thus reducing noise.

In one embodiment, the gas generator housing of the invention is symmetrical about its longitudinal axis so that it can be mounted on either the right side or the left side of the vehicle and has an integral manifold and preferably also an integral heat shield.

Alternatively the housing may be asymmetrical. It may be formed by stamping or cutting an asymmetrical outline from sheet metal and this gives the possibility of providing left- and right-handed items.

Preferably the other end of the housing is open so that the housing can accommodate different length gas generators, and the retaining ring is adjustable so as to accommodate different widths of gas generators.

For a better understanding of the present invention and to show how the same may be carried into effect, reference will now be made to the accompanying drawings in which.

Figure 1:
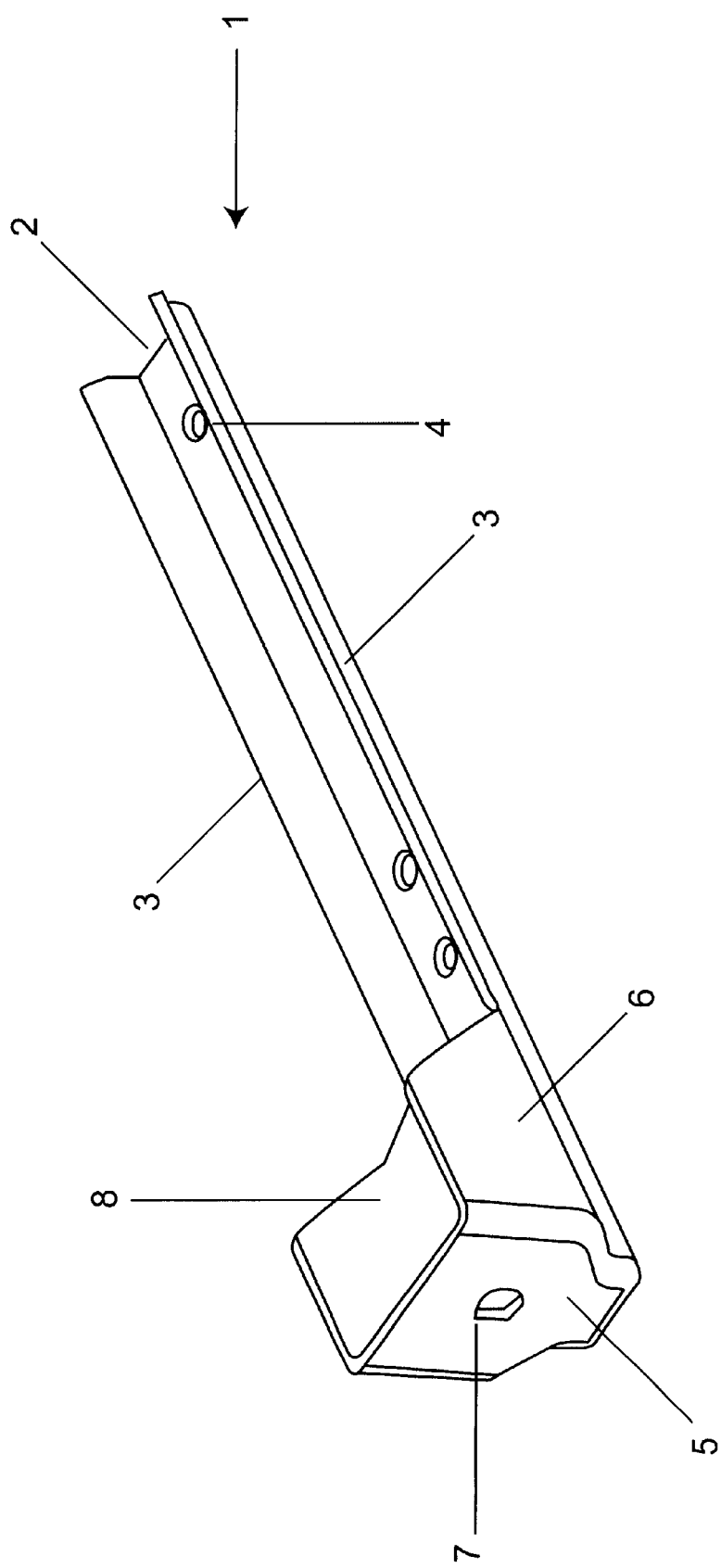
FIG. 1 is a perspective view of a housing according to the invention.

In FIG. 1 the housing 1 comprises a longitudinal back plate 2 with low longitudinal extending side flanges 3. Bolt holes are formed at spaced intervals along the back plate 2.

At one end, a retaining plate 5 extends transversely to the back plate 2 and is integral with high side flanges 6. A fixing hole 7 is provided in the end plate 5. A top cover 8 closes off the side flanges and the end plate. The other end of the housing is open. The fixing hole 7 can be formed as an asymmetrical shape as shown in a way which allows the rotational mounting position of the gas generator to be defined, and thus acts as an orientation feature. One such example is shown in FIG. 1 but many examples of suitable shapes will be evident to one skilled in the art, (e.g. star, hexagon).

Figure 2:
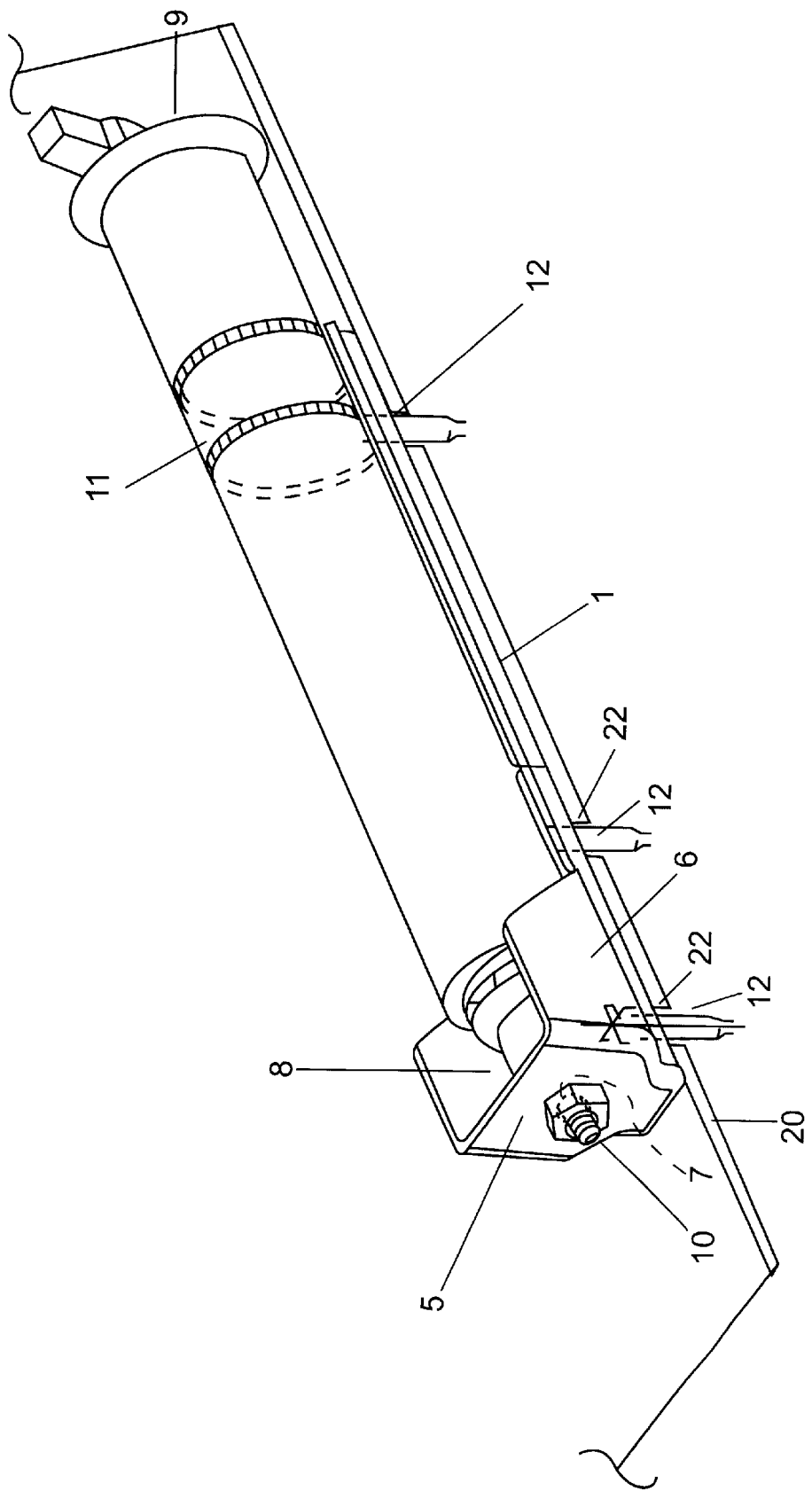
FIG. 2 is a perspective view of the housing of FIG. 1 with a gas generator mounted and shown in broken lines.

FIG. 2 shows the housing 1 with gas generator 9 attached by a bolt 10 through end plate hole 7. The gas generator 9 is shown in broken lines. It is prevented from rattling in the housing by a retaining clamp 11 which circumscribes the body of the gas generator and is secured to the housing back plate 2 through hole 4. One or more clamps 11 are provided at the open end of the housing 1 and more may be provided along the length of the cylinder. The rings may be tightened or adjusted for different cylinder diameters via fixing fasteners such as screws 12.

The open end of the housing enables different lengths of gas cylinder to be accommodated. Thus the housing is particularly versatile. It is also cost effective to produce since the tooling for different unit sizes is saved. In addition, the housing requires relatively little metal and is thus cheap to produce and lighter than hitherto known housing which substantially surrounded the gas generator.

The housing is used as an airbag cushion attachment, or for attaching the entire airbag module to a mounting surface. In particular, the fasteners 12 are received through an opening 22 of an airbag 20.

On the other hand, if the application requires, the manifold part can be formed asymmetrically to provide parts which are left/right dependent. This can be achieved by using asymmetrically preformed stamping from sheet metal and the housings can then be given unique shapes, particularly adapted on each side to act as an integral manifold to direct the inflation gas and also as an integral heat shield.

There are considerable advantages to having the manifold and cushion/module mounting attachment in one piece since less parts are needed leading to cost and weight reductions which are very important.

When the housing is constructed symmetrically according to the invention, then it can be made substantially left-right independent. That is to say that an identical housing production item can be used regardless of whether it is to be mounted on the left or the right side of the vehicle. Thus considerable production costs are saved compared to traditional housings which require adaptation to work for the other side of the vehicle.

What is claimed is:

1. A gas generator housing for a gas generator for a vehicle occupant side airbag inflator, in a vehicle safety restraint, the housing adapted to be received within an airbag, the housing being one piece which is asymmetrical along a longitudinal axis and comprising an elongated back plate for supporting the gas generator, and having means for mounting to a fixed part of the vehicle, the back plate having, at one end region, integral side flanges extending laterally of the gas generator and, at an opposite end region, having a retaining mechanism fixed to the back plate which is arranged to circumscribe the gas generator to hold the gas generator securely to the housing and wherein the mounting means includes a fastener to hold the housing to the fixed part of the vehicle.

2. A gas generator housing for a gas generator as claimed in claim 1 wherein the mounting means is adapted to stick through fabric of the airbag to hold both the housing and the airbag to the fixed part of the vehicle.

3. A gas generator housing according to claim 1 which is symmetrical about its longitudinal axis so that it can be mounted on either the right side or the left side of the vehicle.

4. A gas generator housing according to claim 3 formed from an asymmetrical stamping of sheet metal.

5. A gas generator housing according to claim 1 wherein each flange is spaced oppositely on either side of the longitudinal axis but positioned on only one end of the housing and located to receive gas from the gas generator and thereby forms an integral inflation gas direction guide.

6. A gas generator housing according to claim 1 wherein the end opposite region is open so that the housing can accommodate different length gas generators.

7. A gas generator housing according to claim 1 wherein the retaining mechanism is adjustable so as to accommodate different widths of gas generators.

8. A gas generator housing according to claim 1 comprising at least one bolt hole formed at a predetermined location on the back plate.

9. A gas generator housing according to claim 1 further comprising a retaining plate extending transversely to the back plate integral with side flanges.

* * * * *